United States Patent Office 3,132,127
Patented May 5, 1964

3,132,127
ROSIN AND SIZE PREPARED THEREFROM
Edward Strazdins, Stamford, Conn., assignor to American Cyanamid Company, New York, N.Y., a corporation of Maine
No Drawing. Filed July 28, 1959, Ser. No. 829,971
5 Claims. (Cl. 260—97)

The present invention relates to improving the effectiveness of the reaction product of a rosin with formaldehyde as a raw material for the manufacture of rosin size. The invention includes the improved reaction product itself, liquid and dry rosin size prepared therefrom, and the manufacture of paper therewith.

My copending application Serial No. 600,274, filed on July 30, 1056 (now U.S. Patent No. 2,934,468), discloses and claims a process for improving rosin as a raw material for the manufacture of rosin size. According to a preferred embodiment of the invention, rosin is reacted with a small amount of formaldehyde at 135°–250° C., after which the reaction product is converted to rosin size in customary manner. Paper prepared by the use of the size possesses superior resistance to penetration by aqueous liquids, so that evidently the formaldehyde acts as fortifying agent for the rosin. Moreover, a principal effect of the formaldehyde is to decrease the tendency of the rosin and rosin size prepared therefrom to crystallize on storage.

Subsequent mill trials showed that the size possesses a highly undesirable characteristic, namely a tendency to cause foam. It was found that when the size was added in the customary way to papermaking pulp freshly discharged from a beater, the microscopic bubbles of air which are normally present in such pulp, instead of rising directly to the surface, attached themselves to the cellulose fibers. As a result the fibers became more buoyant so that when the pulp was flowed upon the wire of the Fourdrinier machine, the fibers did not deposit themselves in the desired random orientation but instead formed themselves into aggregates. The resulting paper possessed a non-uniform or "wild" structure and contained pin holes. Paper of this type is weak and has little commercial value.

The tendency of such size to cause foaming is the consequence of the reaction of the rosin with the formaldehyde at 135°–250° C., as described. That this is so appears from the fact that size prepared from untreated tall oil rosin causes virtually no foaming; that size prepared from the same tall oil rosin reacted with as little as 1/40 mol of formaldehyde per mol of rosin causes considerable foaming; and that the amount of foaming increases as larger amounts of formaldehyde are reacted with the rosin.

For brevity, the tendency of a rosin to cause foam when converted into rosin size and used in the manufacture of paper as described is hereinafter termed its "latent foaming tendency."

The present invention is based upon the discovery that the reaction product of rosin with formaldehyde at 135° C.–250° C. is improved as a raw material for the manufacture of paper size by maintaining the reaction product at a temperature between 250° C. and 300° C. until the latent foaming tendency thereof has substantially decreased. I have found in numerous instances, that the latent foaming tendency of rosin-formaldehyde reaction products can be decreased to substantially zero by the heat treatment described.

The invention is further based on the discovery that the heat treatment does not seriously impair the benefits imparted by the formaldehyde. The heat-treated rosin-formaldehyde reaction product, in preferred embodiments, retains its decreased tendency to crystallize when stored as such or after conversion to liquid size.

The rosins which are benefitted by the present invention include the formaldehyde reaction products of gum rosin, wood rosin, tall oil rosin, the fortified adducts of these rosins with $\alpha,\beta$-unsaturated carboxylic acids such as maleic, acrylic, citraconic, and itaconic; disproportionated rosin, and rosin mixtures, for example rosin containing rosin dimer. The invention thus extends to the principal types of rosin employed for the manufacture of paper size.

The duration of the heat treatment should be sufficient to decrease the latent foaming tendency by a substantial amount, and the procedure is not economic unless the amount of foam developed is decreased by at least 10%. The duration of heating to effect any given improvement varies from instance to instance depending chiefly on the temperature of the treatment and amount of combined formaldehyde present. In practice it is most conveniently determined by the laboratory test method shown in the examples below. As a rule of thumb, I have found that the latent foaming tendency of the formaldehyde-rosin reaction products investigated so far is nearly completely overcome, as determined by the test method referred to, when the rosin is heated for three hours at 250° C., for a few moments at 300° C., and for intermediate times at intermediate temperatures.

The preferred temperature range for the heat treatment is between 265° C. and 280° C. In this range the latent foaming tendency of the rosin-formaldehyde condensate is suppressed considerably more rapidly than at say 250° C. and yet neither the color nor the sizing effectiveness of the condensate undergoes significant deterioration, as is sometimes the case when the procedure is performed at 300° C.

The amount of combined formaldehyde in the rosins treated according to the present invention may vary from as little as 1/40 mol (which is about the least amount of formaldehyde needed as fortifying or anticrystallizing agent) to 1 mol (which is about the most that affords improvement in these directions). As the ultimate size for best results need not contain in excess of about 1/4 mol of combined formaldehyde per mol of free and combined formaldehyde present, rosin reacted with more than 1/4 mol of formaldehyde is advantageously diluted with unreacted rosin before conversion into rosin size, or with rosin size after it has been saponified.

Rosins containing more than about 2/3 of formaldehyde tend to darken during the heat treatment. Accordingly, best results from this point of view and from the point of view of efficient utilization of apparatus are obtained when the rosin contains about 2/3 mol of formaldehyde down to about 1/3 mol, per mol of free and combined rosin present.

The reaction of formaldehyde with rosin causes evolution of water vapor. According to one embodiment of the process the formaldehyde is reacted with the rosin at a temperature below 250° C. in a pressure vessel to prevent loss of formaldehyde vapor, after which at least a major part of the vapor is vented and the rosin-formaldehyde condensate heated to 250°-300° C. at about atmospheric pressure. By this means equipment having a low pressure safety factor may be used for both parts of the treatment.

However, if desired, the formaldehyde may be introduced into the rosin while it is at a temperature between 250° and 300° C., so that the formaldehyde reaction and the heat treatment are performed at about the same temperature. In such event the formaldehyde reaction proceeds rapidly, but a high pressure autoclave is necessary to contain the pressures developed by the water vapor.

The heat-treated rosin-formaldehyde reaction product of the present invention is made into liquid or dry rosin size and used in the manufacture of paper in substantially the same manner as has been employed in the case of ordinary rosin.

The invention will be more particularly described by reference to the examples which follow. These examples represent specific embodiments of the invention and are not to be construed as limitations thereon. The temperature ranges set forth in the text above and in the examples which follow are typical, and in numerous instances good results are obtained above and below the range figures stated.

Example 1

The following illustrates the treatment of tall oil rosin according to several embodiments of the present invention to improve it as a raw material for the manufacture of rosin size. The conversion of the treated rosin to rosin size is also illustrated, together with the properties of the product. Tall oil rosin of X color (a high purity tall oil rosin of low latent foaming tendency) was reacted with formaldehyde and then heat-treated in the range 250° C.-300° C. as shown in detail in the table below.

The products were tested for their tendency to crystallize, after which they were converted into liquid rosin size containing 75% solids by weight and 20% free acid based on the weight of the size solids. The sizes were tested to determine their tendency to crystallize and their effectiveness as sizing agents for paper.

The tendency of the heat-treated rosin-formaldehyde reaction products to crystallize was determined by taking 50-gm. samples, stirring into each a trace (0.1 gm. or less) as seeding agent of finely ground rosin which had previously crystallized, incubating the samples at 110° C., and determining the percent of crystallization by microscopic observation from time to time. Rosin which does not develop more than 30% of crystallization in 24 hours is regarded as commercially satisfactory, and it is known that rosin which exhibits no crystallization in 24 hours will remain free from crystals indefinitely.

The crystallization of the liquid sizes was determined by seeding 50 gm. of size with traces of ground 3:1 type rosin size crystals and incubating the seeded size in sealed glass vials at 70° C. for 40 days. The rate of crystallization was followed by periodic microscopical examination. The crystal population in the field was expressed as percentage of the area observed. Sizes which develop less than 20% crystallization in 40 days are commercially satisfactory.

The effectiveness of the sizes was determined by forming a pulp of a 50:50 by weight mixture of bleached sulfite: bleached hardwood fibers at 0.6% consistency, adding 1.0% of the size to be tested and 1.5% of alum to the pulp (solids based on the dry weight of the fibers), sheeting the pulp to form handsheets at 50 lbs. and 200 lbs. basis weight (25" x 40"/500 ream), and drying the sheets on a laboratory drum dryer at 240° F. The sizing results were obtained by a standard total immersion method using thick sheets, according to which the sheets are weighed, immersed for 15 minutes in water at 70° F., surface water removed by pressing between dry blotters, and re-weighed. Results are reported as the percentage of water absorbed based on the dry weight of the fibers.

The lactic acid sizing results were obtained by the penescope method using the thin sheets, wherein the paper carrying an indicator dye on the bottom is covered with 20% aqueous lactic acid solution at 100° F. and the sizing results are reported as the number of seconds required for the solution to pass through the paper as shown by the change of color of the dye.

The foam test was performed by agitating 2.5 gm. of paper pulp and 250 ml. of water in a high-speed mixer (Waring Blendor) for two minutes, adding with continued agitation 5 ml. of a 3% by weight aqueous solution of the size to be tested followed one minute later by 5 ml. of a 10% by weight solution of papermaker's alum, continuing the agitation for 30 seconds, pouring the resulting suspension in water of cellulose fibers carrying bubbles of air into a 500 ml. graduate, and recording the thickness of the layer of clear liquid which develops at the bottom of the graduate from use of foam-producing size. Development of this clear layer shows that the fibers are buoyant and therefore that they contain foam. Failure of a layer to develop indicates that the fibers contain little or no foam.

Experience shows that sizes which result in formation of a clear layer containing less than 20 ml. of fluid are generally satisfactory for most commercial uses.

| Run No. | $CH_2O$ | | | Heat Treatment | | Crystallization | | | | Foam Test [3] | Sizing | |
|---|---|---|---|---|---|---|---|---|---|---|---|---|
| | | | | | | Rosin | | Rosin Size | | | | |
| | Mol [1] | React. Temp., °C. | Time, Min. | Temp., °C. | Time, Min. | Percent [2] | Hrs. | Percent [2] | Days | | Percent $H_2O$ Abs. [4] | Lactic Acid Resist., Sec. |
| A | | | | | | 100 | 1 | 100 | 1 | 0 | 49 | 80 |
| B | 0.3 | 160 | 180 | | | 10 | 24 | 15 | 40 | [5] 50 | 42 | 130 |
| C | | | | 275 | 30 | 100 | 1 | 100 | 2 | 0 | 51 | 75 |
| D | 0.3 | 160 | 60 | 275 | 30 | 0 | 24 | 0 | 40 | 0 | 42 | 129 |
| 1 | 0.2 | 160 | 60 | 275 | 30 | 1 | 24 | 5 | 40 | 0 | 45 | 110 |
| 2 | 0.4 | 160 | 60 | 275 | 30 | 0 | 24 | 0 | 40 | 0 | 42 | 115 |
| 3 | 0.5 | 160 | 60 | 275 | 30 | 0 | 24 | 0 | 40 | 5 | 43 | 116 |
| 4 | 0.3 | 160 | 60 | 260 | 120 | 10 | 24 | 10 | 40 | 5 | 43 | 120 |
| 5 | 0.3 | 160 | 60 | 270 | 60 | 0 | 24 | 0 | 40 | 0 | 42 | 110 |
| 6 | 0.3 | 160 | 60 | 280 | 30 | 0 | 24 | 0 | 40 | 0 | 43 | 115 |
| 7 | 0.3 | 160 | 60 | 290 | 30 | 0 | 24 | 0 | 40 | 0 | 45 | 107 |
| 8 | 0.3 | 200 | 30 | 275 | 30 | 0 | 24 | 0 | 40 | 0 | 43 | 112 |

[1] Per mol of rosin.
[2] Percent converted to crystallized mass.
[3] Volume (ml.) of clear layer at bottom of graduate after 30 minutes of standing.
[4] Based on dry weight of sheet.
[5] The clear layer formed within 30 seconds.

Example 2

The following illustrates the effect of the process of the present invention in improving other varieties of rosin.

The procedure of Example 1 was repeated except that the rosins shown in the table were employed instead of the untreated tall oil rosin of Example 1. Results were as follows:

| No. | Rosin | Mols CH$_2$O [1] | Heat Treat., °C. [2] | Crystallization | | | | Foam Test, ml. [3] | Percent H$_2$O Abs. [3] |
|---|---|---|---|---|---|---|---|---|---|
| | | | | Rosin | | Rosin Size | | | |
| | | | | Percent | Hrs. | Percent | Days | | |
| A | Gum | 0.1 | | 1 | 24 | 5 | 40 | >50 | 42 |
| B | Wood | 0.2 | | 5 | 24 | 1 | 40 | >50 | 43 |
| C | Tall oil-maleic anhydride [4] | 0.2 | | 1 | 24 | 10 | 40 | >50 | 35 |
| D | Tall oil-fumaric acid [4] | 0.2 | | 1 | 24 | 5 | 40 | >50 | 35 |
| E | Tall oil-citric acid [4] | 0.2 | | 1 | 24 | 2 | 40 | >50 | 36 |
| F | Tall oil-rosin dimer [5] | 0.2 | | 0 | 24 | 0 | 40 | >50 | 48 |
| 1 | Gum | 0.1 | 275 | 0 | 24 | 0 | 40 | 0 | 41 |
| 2 | Wood | 0.2 | 275 | 0 | 24 | 0 | 40 | 0 | 43 |
| 3 | Tall oil-maleic anhydride [4] | 0.2 | 265 | 0 | 24 | 0 | 40 | 0 | 34 |
| 4 | Tall oil-fumaric acid [4] | 0.2 | 265 | 0 | 24 | 0 | 40 | 0 | 36 |
| 5 | Tall oil-citric acid [4] | 0.2 | 265 | 0 | 24 | 0 | 40 | 0 | 35 |
| 6 | Tall oil-rosin dimer [5] | 0.2 | 275 | 0 | 24 | 0 | 40 | 0 | 49 |

[1] Per mol of rosin. Reaction temperature 175° C.
[2] Duration of treatment 30 minutes.
[3] For details of test see Example 1.
[4] Prepared by heating rosin with 1/5 mol of fortifying agent named for 1 hour at 160°–175° C.
[5] Prepared by dimerizing tall oil rosin and then diluting with unreacted rosin to 10% rosin dimer content

Example 3

The following illustrates the treatment of tall oil rosin by the present invention on a commercial scale, wherein the rosin is reacted with the formaldehyde at comparatively low temperature and pressure, after which the gas is vented and the reaction product is heat-treated at atmospheric pressure at high temperature.

The process was performed in a closed 2000 gal. Dowtherm heated kettle equipped with a stirrer and having a maximum working pressure of 250 lbs./in.$^2$. Into this kettle was pumped 10,000 lbs. of tall oil rosin (color WW) at 160° C. which contains less than 2% by weight of fatty acids. There was then added to the kettle with stirring 300 lbs. (⅓ mol) of flake paraformaldehyde and the kettle promptly sealed. The temperature of the rosin was increased to 230° C. in one hour, at which time the kettle was vented to discharge the water vapor which had formed. Carbon dioxide gas was bubbled through the rosin to facilitate removal of the water vapor. The temperature of the rosin was then increased to 270° C. in 30 minutes and the rosin maintained at that temperature for an additional 15 minutes.

The rosin was then cooled to 160° C. and saponified with aqueous sodium hydroxide to a liquid size at 70% solids by weight and 15% free acid by weight based on the weight of the size solids.

The size was then shipped to a commercial paper mill and used in the manufacture of paper from bleached kraft pulp. The size was added at 2% based on the dry weight of the fibers and was set on the fibers by addition of alum. No foam at all developed by the size during formation of the paper. Sheet uniformity was satisfactory. A previous batch of tall oil rosin size prepared and used in the same manner except that the heat-treating step had been omitted caused such severe foaming that operation of the papermaking machine had to be halted and a different size employed.

Example 4

The following illustrates the preparation of rosin according to the present invention by first reacting rosin with a comparatively large amount of formaldehyde followed by heat treatment and dilution of the product with untreated rosin.

The general procedure of Example 3 was repeated except that a smaller vessel was used, the amount of rosin was decreased to 5,000 lbs. so that the paraformaldehyde added was equivalent to ⅔ mol, and the pressure in the vessel while the paraformaldehyde was reacting was maintained at 80 lbs./in.$^2$ by periodic ventings.

After the heat treatment at 270° C. the rosin was blended with 6,500 lbs. of tall rosin which had not been subjected to the process and the resulting blend was tested as described. It was slightly darker in appearance, but yielded substantially identical results when converted into size.

Example 5

The following illustrates the high-speed, high-pressure treatment of tall oil rosin according to the present invention.

A laboratory rocking-type autoclave of ½ liter capacity containing a self-dumping reagent holder was preheated to 275° C. Into the autoclave was poured 300 gm. of rosin at 275° C., and a watch glass containing 15.0 gm. (½ mol) of flake paraformaldehyde was placed in the reagent holder. The autoclave was sealed and the rocker started, upon which the contents of the watch glass were dumped into the rosin. After 15 minutes the autoclave was cooled to 140° C. and vented and the reaction product diluted and cooled with 200 gm. of rosin. The product contained 0.3 mol of combined formaldehyde per mol of rosin taken.

The rosin and rosin size prepared therefrom gave satisfactory crystallization test results, and the rosin size developed substantially no foam when used in paper manufacture.

I claim:

1. A process for the manufacture of a sizing agent for paper from a rosin which comprises reacting said rosin with $\frac{1}{40}$ to 1 mol of formaldehyde at a temperature below 300° C., manitaining the product of the reaction at a temperature between 250° C. and 300° C. until the latent foaming tendency of said product has substantially decreased, and saponifying the product with aqueous alkali metal alkali solution to convert said product into liquid rosin size.

2. A process according to claim 1 wherein the rosin is tall oil rosin.

3. A process according to claim 1 wherein the temperature at which said product is maintained is between 265° C. and 280° C.

4. A sizing agent for paper prepared by the process of claim 1.

5. In the manufacture of liquid rosin size from the product formed by reacting a rosin with $\frac{1}{40}$ to 1 mol of formaldehyde per mol of rosin at a temperature below 230° C. followed by saponification of said product with aqueous alkali metal alkali solution to convert said product into liquid rosin size, the improvement which comprises maintaining said product at a temperature between 250° C. and 300° C. until the latent foaming tendency of said product has substantially decreased.

References Cited in the file of this patent

UNITED STATES PATENTS

| | | |
|---|---|---|
| 2,720,514 | Rummelsburg | Oct. 11, 1955 |
| 2,941,919 | Watkins | June 21, 1960 |

UNITED STATES PATENT OFFICE
CERTIFICATE OF CORRECTION

Patent No. 3,132,127 　　　　　　　　　　　　　　May 5, 1964

Edward Strazdins

It is hereby certified that error appears in the above numbered patent requiring correction and that the said Letters Patent should read as corrected below.

Column 1, line 15, for "600,274" read -- 600,724 --; line 16, for "July 30, 1056" read -- July 30, 1956 --; column 4, lines 37 and 38, for "contined" read -- continued --; columns 3 and 4, in the table, last column, line 2 thereof, the indistinct numeral should read -- 130 --; column 6, line 59, for "manitaining" read -- maintaining --.

Signed and sealed this 23rd day of March 1965.

(SEAL)
Attest:

ERNEST W. SWIDER　　　　　　　　　　　　　EDWARD J. BRENNER
Attesting Officer　　　　　　　　　　　　　　Commissioner of Patents